United States Patent [19]

Chang

[11] Patent Number: 4,720,177

[45] Date of Patent: Jan. 19, 1988

[54] TUNABLE ACOUSTO-OPTIC FILTER UTILIZING INTERNAL MODE CONVERSION

[76] Inventor: I-Cheng Chang, 649 Nashua Ct., Sunnyvale, Calif. 94087

[21] Appl. No.: 655,910

[22] Filed: Sep. 28, 1984

[51] Int. Cl.$^4$ .............................................. G02F 1/11
[52] U.S. Cl. ..................................... 350/372; 350/358
[58] Field of Search .......................... 350/372, 358, 404

[56] References Cited

U.S. PATENT DOCUMENTS

| | | | |
|---|---|---|---|
| 3,679,288 | 7/1972 | Harris | 350/358 |
| 3,953,107 | 4/1976 | Yano et al. | 350/372 |
| 4,052,121 | 10/1977 | Chang | 350/372 |
| 4,342,502 | 8/1982 | Chang | 350/358 |

Primary Examiner—Bruce Y. Arnold

[57] ABSTRACT

An electronically tunable optical filter utilizing noncollinear acousto-optic interaction in a birefringent crystal. Light is diffracted by a secondary acoustic wave generated from a primary acoustic wave by mode conversion at an internal surface of the birefringent crystal. A preferred configuration is described in which the primary acoustic wave is excited by acoustical transducers bonded to the same face as the optical aperture. The configuration has the advantages of simpler construction and improved performance.

4 Claims, 5 Drawing Figures

TUNABLE ACOUSTO-OPTIC FILTER UTILIZING INTERNAL MODE CONVERSION

BACKGROUND OF THE INVENTION

1. Field of the Invention

This invention relates to the field of electronically tunable optical filters utilizing noncollinear acousto-optic interaction in a birefringent crystal.

2. Description of Prior Art

Electronically tunable optical filters have been constructed so that a cone of light of a first polarization is diffracted by an acoustic wave in a birefringent crystal to shift from the first to a second polarization of the light beam for a selected bandpass of optical frequencies. The center wavelength of the passband of this type of filter is electronically tunable by changing the frequency of the acoustic wave within the crystal.

Two basic types of tunable acousto-optic filters (TAOF) have been constructed: collinear and noncollinear. In the collinear filter, the incident and diffracted light beams inside the birefringent crystal are collinear with the acoustic beam. The diffracted light beam at the selected passband is separated from the incident light beam by crossed polarizers. The collinear type of acousto-optic filter is disclosed in an article entitled "Acousto-Optic Tunable Filters" appearing on pages 744–747 in the June, 1969 issue of *The Journal of the Optical Society of America* (Vol. 59, No. 6), and in U.S. Pat. No. 3,679,288 entitled "Tunable Acousto-Optic Method and Apparatus."

In the noncollinear filter, the light beams inside the birefringent crystal are noncollinear with the acoustic beam. The diffracted light beam at the passband is selected from the incident light beam by either crossed polarizers or spatial separation. The noncollinear type of acousto-optic filter is disclosed in an article entitled "Noncollinear Acousto-Optic Filter with Large Angular Aperture" appearing on pages 370–372 of the Oct. 15, 1974 issue of the *Applied Physics Letters* (Vol. 25), and in U.S. Pat. No. 4,052,121 entitled "Noncollinear Tunable Acousto-Optic Filter."

In both the collinear and noncollinear types of tunable acousto-optic filters, the acousto-optic diffraction occurs for a narrowband of optical frequencies satisfying the relation that the sum of the momentum vectors of the incident light waves and acoustic waves equal the momentum vector of the diffracted light wave. More significantly, this narrow filter bandpass can be maintained for incident light having a distribution of incident directions. This large angular aperture characteristic is due to the proper choice of acousto-optic interaction geometry wherein the tangents to the loci of incident and diffracted light wavevectors are parallel. When the "parallel tangents" condition is met, the acousto-optic diffraction becomes relatively insensitive to the angle-of-light incidence, a process that is referred to as "noncritical phase matching." For the remainder of this disclosure, "tunable acousto-optic filter" or the abbreviation "TAOF" will be defined as an optical filter that operates on the basis of acousto-optic diffraction in a birefringent crystal wherein the noncritical phase matching condition is satisfied. This type of tunable acousto-optic filter is clearly distinguishable from the type with small angular aperture as described in an article entitled "New Noncollinear Acousto-Optic Tunable Filter Using Birefringence in Paratellurite" appearing on pages 256–257 of the Mar. 15, 1974 issue of *Applied Physics Letters* (Vol. 24), and in U.S. Pat. No. 3,953,107 entitled "Acousto-Optic Filters." The latter device is basically a narrowband deflector rather than a filter since its use must be restricted to well collimated light sources.

A preferred configuration of the noncollinear TAOF is disclosed in U.S. Pat. No. 4,342,502 entitled "Transverse Tunable Acousto-Optic Filter." The transverse configuration has the significant features of increased optical aperture and minimized optical aberrations. Practical implementation of the TAOF including, in particular, the transverse configuration has been hindered due to difficulties in the fabrication and impedance matching of acoustical transducers. The problem is particularly severe in the construction of tunable acousto-optic filters for realizing high spectral resolution.

SUMMARY OF THE INVENTION

The present invention provides a preferred configuration or interaction geometry in a noncollinear TAOF with the advantages of simpler construction and improved performance. Specifically, the present invention describes a TAOF configuration utilizing a birefringent crystal, where the acoustical transducer is mounted in intimate contact onto the same face as the optical aperture and where the propagating acoustic wave responsible for the acousto-optic filtering is produced by mode conversion at an internal reflecting surface of the birefringent crystal.

One feature of the present invention is to provide a TAOF that allows simpler fabrication procedures for mounting the acoustical transducer. Another feature of the present invention is to provide a TAOF with a smaller acoustic transducer area and correspondingly higher impedance for simpler impedance matching. A further feature of the present invention is to provide a TAOF having high spectral resolution.

DESCRIPTION OF THE PREFERRED EMBODIMENTS

Figure 1:
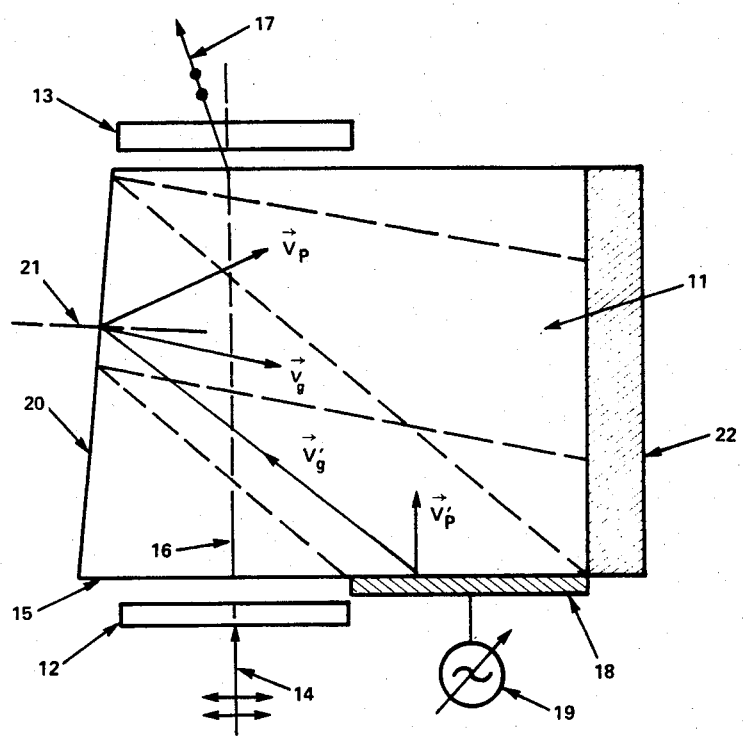
FIG. 1 is a schematic representation of a noncollinear TAOF configuration in accordance with the present invention.

With reference to FIG. 1, therein is shown, diagrammatically, a noncollinear TAOF configuration in accordance with the present invention. The TAOF comprises a suitable optical anisotropic medium such as a birefringent crystal 11 with an optic axis referred to as the Z-axis, an input polarizer 12 and an output analyzer 13. The input cone of light beam 14 is polarized by the input polarizer 12, enters the crystal 11 through the optical aperture surface 15 with a surface normal 16 along a predetermined crystalline orientation, passes out the opposite face of the crystal and the output analyzer as the output light beam 17.

One or more acoustic transducers 18 (one transducer is shown in the figure) are mounted in intimate contact with the crystal 11 on a bonding surface 23 with a surface normal 24 (Which makes an angle $\theta_a'$ with Z-axis). In general the bonding face is not coincided with the optical aperture surface 15, (FIG. 1 shows a preferred embodiment in which the bonding face 23 is the same surface extended from the optical aperture 15). The transducers, which can be either longitudinal or shear, are connected to a suitable radio frequency signal source 19, such as a voltage controlled oscillator, the frequency and amplitude of which can be varied. The acoustic wave generated at the transucer 18 is launched into the crystal 11 and propagates with its wavenormal along surface normal 24 with the acoustic phase velocity $\vec{V_p}'$, (which is perpendicular to the transducer bonding face 23). The energy flow of the acoustic wave is along the group velocity $\vec{V_g}'$, which is nonlinear to $\vec{V_p}'$ in an acoustically anisotropic medium. The acoustic wave is incident onto a reflecting face 20 with a surface normal 21 of predetermined orientation. The reflecting surface 20 is oriented at an angle $\alpha$ relative to the transducer bonding face 23. (i.e., $\alpha$ is angle between surface normal 21 and surface normal 24). A new acoustic wave is generated at the reflecting face 20 by mode conversion and propagates in the birefringent crystal 11 and is absorbed by the acoustic termination 22. The acoustic wave travels with an acoustic phase velocity $\vec{V_p}$ along an axis 25 (which makes an angle $\theta_a$ with the Z-axis) and acoustic group velocity $\vec{V_g}$. The orientation of the reflecting face 20 (i.e., the surface normal direction 21) is properly chosen so that the diffraction of light by the reflected acoustic wave satisfies the "parallel tangents" condition. The structure of the TAOF of the present invention is defined by the birefringent crystal 11 with an optic axis (Z-axis), the optical aperture 15 with surface normal 16, the acoustical transducer 18, the bonding face 23 with surface normal 24 (making an angle $\theta_a'$ with Z-axis), the reflecting surface 20 with surface normal 24, and the internally reflected acoustic wave traveling along the axis 25 (oriented at an angle $\theta_a$ to Z-axis). The proper relationship of reflecting surface orientation (angle $\alpha$) to acoustic wave direction (polar angles $\theta_a'$ and $\theta_a$) will be derived later in this disclosure.

Figure 2:
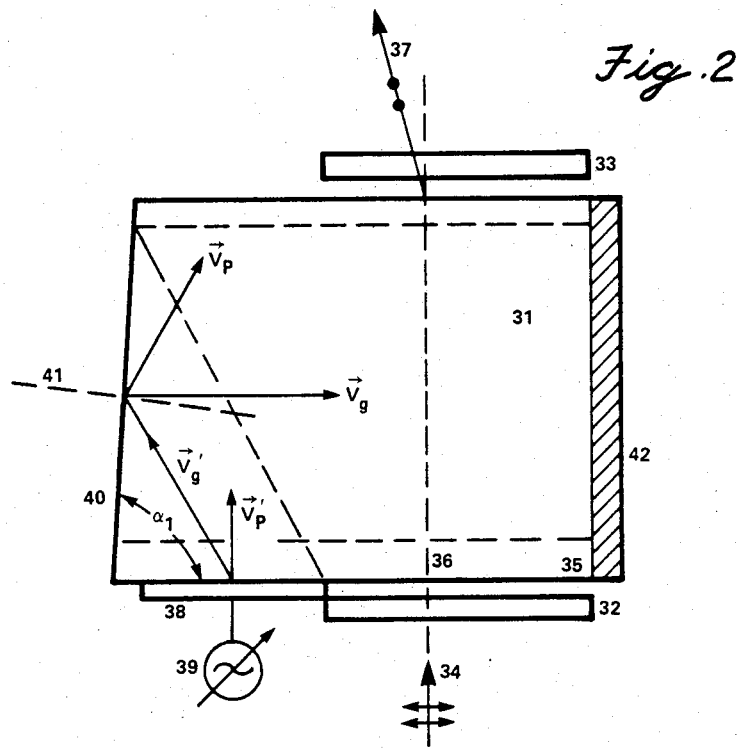
FIG. 2 is a schematic representation of the transverse TAOF configuration in accordance with the present invention.

Referring to FIG. 2, there is shown, diagrammatically, a transverse TAOF configuration in accordance with the present invention. The TAOF comprises a suitable optically anisotropic medium such as a birefringent crystal 31, an input polarizer 32 and an output analyzer 33. The input cone of light beam 34 is polarized by the input polarizer 32, enters the crystal 31 through the optical aperture portion of a polished surface 35 with a surface normal 36 along a predetermined crystalline orientation, passes out the opposite face of the crystal and the output analyzer as the output light beam 37.

One or more acoustic transducers 38 (one transducer is shown in the figure) are mounted in intimate contact with the crystal 31 on the surface 35 extended from the optical aperture. The transducers, which can be either longitudinal or shear, are connected to a suitable radio frequency signal source 39, such as a voltage controlled oscillator, the frequency and amplitude of which can be varied. The acoustic wave generated at the transducer 38 is launched into the crystal 31 and propagates with its wavenormal along the acoustic phase velocity $\vec{V_p}'$ (which is perpendicular to the transducer bonding face 35). The energy flow of the acoustic wave is along the group velocity $\vec{V_g}'$, which is nonlinear to $\vec{V_p}'$ in an acoustically anisotropic medium. The acoustic wave is incident onto a reflecting face 40 with a surface normal 41 of predetermined orientation. A new acoustic wave is generated at the reflecting face 40 by mode conversion and propagates in the birefringent crystal 31 and is absorbed by the acoustic termination 42. The acoustic wave travels with an acoustic phase velocity $\vec{V_p}$ (which is the same direction as the acoustic wavevector $\vec{k_a}$) and acoustic group velocity $\vec{V_g}$. The orientation of the reflecting face 40 (i.e., the surface normal direction 41) is properly chosen so that the acoustic wavevector $\vec{k_a}$ satisfies the "parallel tangents" condition and the group velocity $\vec{V_g}$ is perpendicular to the optical beam direction, which is the same as the surface normal 16 (transverse configuration).

Figure 3:
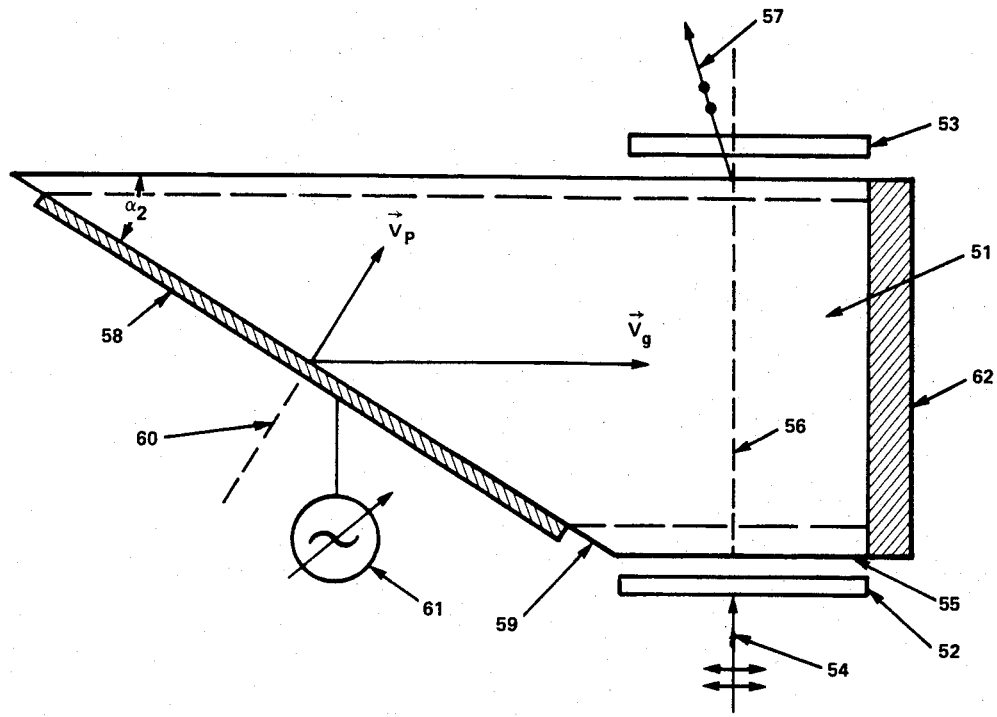
FIG. 3 is a schematic representation of a prior art transverse TAOF configuration.

Now, with reference to FIG. 3, there is shown, diagrammatically, a typical prior art transverse TAOF configuration. The filter comprises a suitable optical anisotropic medium such as a birefringent crystal 51, an input polarizer 52 and an output analyzer 53. The input cone of light beam 54 is polarized by the input polarizer 52, enters the medium 51 through the optical aperture 55, propagates along a predetermined axis 56 of the birefringent crystal, passes out the opposite face of medium 51 as the output 57, and then passes through the output analyzer 53.

One or more acoustical transducers 58 (one transducer is shown in the figure) are mounted in intimate contact with the crystal 51 on a predetermined surface 59 with a surface normal 60 and are connected to a suitable generator or source 61, such as a voltage controlled oscillator, the frequency and amplitude of which can be varied. The acoustic wave generated at the transducer is launched in the crystal 51 and absorbed by the acoustic termination 62. The wavenormal of the generated acoustic wave is along the acoustic phase velocity $\vec{V_p}$ (which is the same direction as the acoustic wavevector $\vec{k_a}$) and the energy flow of the acoustic wave is along the group velocity $\vec{V_g}$. For the acoustically anisotropic mode, $\vec{V_p}$ and $\vec{V_g}$ are generally noncollinear. The acoustic phase velocity direction $\vec{V_p}$ is chosen in such a way so that the tangents to the locus of the incident and diffracted light wavevectors are parallel ("parallel tangents" condition). The acoustic group velocity direction $\vec{V_g}$ is chosen to be perpendicular to the optical beam direction (transverse configuration). The direction of the optical beam (or ray) in a birefringent crystal coincides with that of the ordinary polarized optical wavevector.

For purpose of comparison, it is shown, both in the prior art transverse TAOF, FIG. 3 and in the transverse TAOF of the present invention, FIG. 2, the equal size of optical aperture (same as the size of the polarizer) and optical interaction length (and, consequently, equal spectral resolution). It is noted that angle $\alpha_2$ in the prior art transverse TAOF configuration shown in FIG. 3 is quite small (it is approximately equal to 32.6° for a TeO$_2$ transverse TAOF), while the angle $\alpha_1$ in the present invention of transverse TAOF configuration shown in FIG. 3 is close to 90° (it is approximately equal to 81.3° for a TeO$_2$ transverse TAOF). The small prism angle $\alpha_2$ in the prior art TAOF configuration has been the primary cause for fabrication difficulties. Mounting the acoustic transducer in intimate contact to the acoustic face is generally accomplished by a vacuum bonding technique such as one described in U.S. Pat. No. 2,754,238, issued July 10, 1956 to D. L. Arenberg. Extremely high pressure on the order of several thousand psi is required for adequate bonding. Applying such high bonding pressure to 2 crystal (e.g., TeO$_2$) prism with a small slant angle in the configuration shown in FIG. 3 is hardly possible without cracking the crystal. In the TAOF configuration of the present invention shown in FIG. 1, the transducer is bonded to the optical aperture which is one of the parallel faces of the right prism. Mounting of the transducer to the filter crystal can be readily accomplished even when very high bonding pressure is required. In addition, because of the small prism angle in the prior art TAOF configuration ($\alpha_2$ in FIG. 3), the ratio of transducer length to optical interaction length is large. In the TAOF configuration of the present invention, the size of the transducer (and corresponding capacitance) is reduced compared to prior art. This has the important advantage of simplified impedance matching. Furthermore, the overall size of the birefringent crystal is also reduced. All these advantages of the present invention are particularly important for TAOF having high spectral resolution (where long optical interaction length is used).

The noncollinear TAOF configuration of the present invention provides significant improvement over the prior art by the choice of coplanar transducer and optical face and the use of internal mode conversion. The following is a detailed theoretical analysis of the noncollinear TAOF utilizing internal mode conversion. The analysis provides the design equations for the proper choice of the crystalline orientation of the mode conversion surface.

Figure 4:
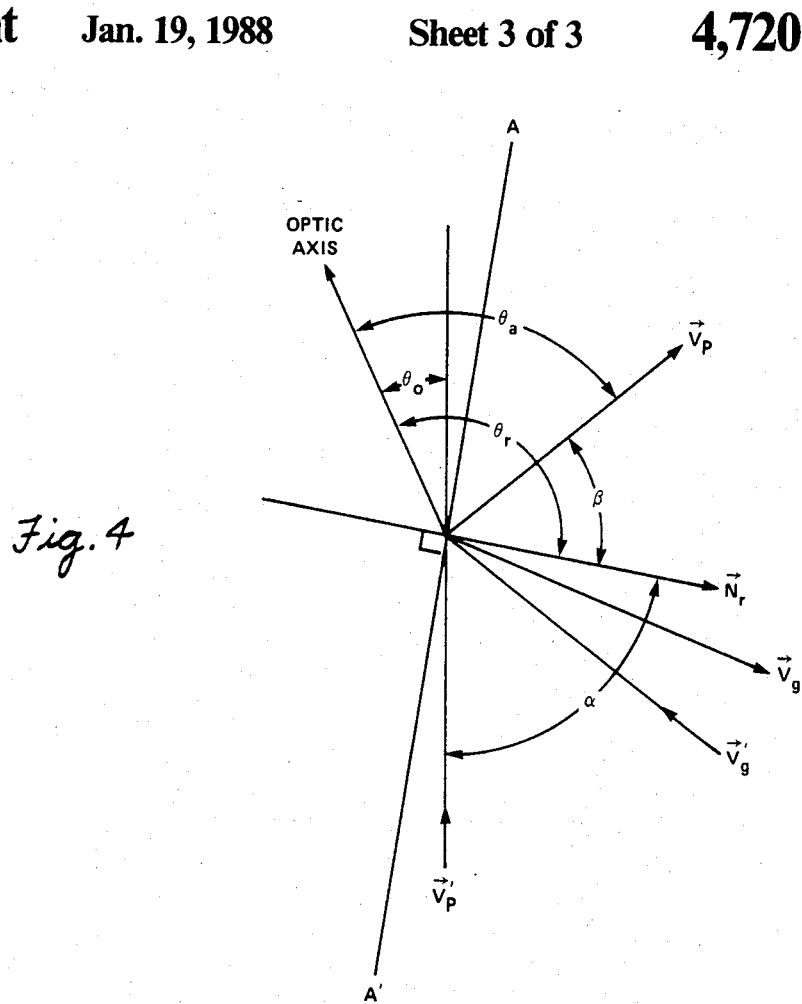
FIG. 4 is a wavevector diagram for a noncollinear TAOF in accordance with the present invention.

Refer to FIG. 4, which shows the wavevector diagrams of the noncollinear TAOF configuration of the present invention (for instance, the embodiment shown in the schematic diagram of FIG. 1. FIG. 4 shows the wavevector general case where $\vec{k}_a'$ (with acoustic phase velocity $\vec{V}_p'$) for the acoustic wave generated at the transducer is not along the same direction as the normal $\vec{N}_o$ or the incident optical wavevector $\vec{k}_o$. (It is to be noted that in the special case shown in FIG. 1, the acoustic wavevector $\vec{K}_a'$ is collinear with the incident optical wavevector $\vec{k}_o$.) The energy flow of the acoustic wave is along the acoustic group velocity $\vec{V}_g'$ which is noncollinear with $\vec{V}_p'$ in an acoustically anisotropic crystal. The propagating wave, which may be either shear or longitudinal, is incident on the reflecting plane with a normal $\vec{N}_r$. Efficient mode conversion will occur at the reflecting face (shown as AA' in FIG. 4) if the tangential components of the acoustic wavevectors (i.e., parallel to the reflecting surface) for the incident and reflecting mode are continuous, i.e., $$\frac{1}{V_p'} \sin\alpha = \frac{1}{V_p} \sin\beta \quad (1)$$

where $V_p'$ and $V_p$ are the magnitudes of the phase velocities for the incident and reflected acoustic waves, respectively; $\alpha$ and $\beta$ are the corresponding angles that the acoustic wavevectors make with the normal $\vec{N}_r$ of the reflecting plane. In the design, both normals $\vec{N}_o$ and $\vec{N}_r$ are chosen to lie in the same plane which coincides with a constant azimuth plane ($\phi$=constant) of the birefringent crystal. From the wavevector geometry shown in FIG. 4, it follows that $$\alpha = \theta_a' - \theta_r, \beta = \theta_a - \theta_r \quad (2)$$

where $\theta_a'$, $\theta_a$ and $\theta_r$ are the polar angles for the incident acoustic wavevector $\vec{k}_a'$ the reflected acoustic wavevector $\vec{k}_a$ and the reflecting plane normal $\vec{N}_r$, respectively. The polar angles are measured from the optic axis (Z-axis) of the birefringent crystal. Notice that in the special configuration shown in FIG. 1, the incident acoustic wavevector is collinear with the optical wavevector i.e., $$\theta_a' = \theta_o \quad (3)$$

The acoustic phase velocity is a function of the propagation direction of the acoustic wave (i.e., the slowness curve). For instance, for the (110) polarized shear acoustic wave in TeO$_2$, the slowness curve can be expressed explicity as a function of the acoustic wavevector direction ($\theta_a$), $$V_p(\theta_a) = \left( \frac{1}{\rho} (C_{44}\cos^2\theta_a + C_{66}^*\sin^2\theta_a) \right)^{\frac{1}{2}} \quad (4)$$

where $\rho$ is the mass density. $C_{44}$, $C_{66}^*$ ($=(C_{11}-C_{12})/2$) are the appropriate elastic coefficients.

Substituting Equation (2) into Equation (1) to get
$$\sin(\theta_a' - \theta_r)/V_p(\theta_a) = \sin(\theta_a - \theta_r)/V_p(\theta_a) \quad (5)$$

Equation (5) can be solved to yield $$\tan\theta_r = \frac{V_p(\theta_a')\sin\theta_a - V_p(\theta_a)\sin\theta_a'}{V_p(\theta_a')\cos\theta_a - V_p(\theta_a)\cos\theta_a'} \quad (6)$$

From Equations (2) and (6), the following expression for the angle $\alpha$ is obtained. ($\alpha$ is the angle between the incident acoustic wavevector $\vec{k}_a'$ and the normal $\vec{N}_r$ of the reflecting surface)

$$\tan\alpha = \frac{V_a(\theta_a')\sin(\theta_a' - \theta_a)}{V_a(\theta_a) - V_a(\theta_a')\cos(\theta_a' - \theta_a)} \quad (7)$$

Now, for proper operation of a TAOF, the condition of "parallel tangents" yields $$\tan\theta_o \tan(\theta_a - \theta_o) = 2 \quad (8)$$

where $\theta_o$ is the polar angle of the incident optical wavevector. Derivation of Equation (8) was given in an article entitled "Analysis of the Noncollinear Acousto-Optic Filter" appearing in the Dec. 11, 1975 issue of the *Electronics Letters* (Vol. 11, Nov. 25/26). Equations (7) and (8) are the design equations for the noncollinear TAOF utilizing internal mode conversion. For a chosen direction of incident optical wavevector ($\theta_o$) and the direction of the phase velocity $\vec{V}_p'$ of the primary acoustic wave generated at the transducer, solution of equation (8) gives the proper propagating direction of the secondary acoustic wave ($\theta_a$). Furthermore, for a given propagation direction of the first acoustic wave ($\theta_a'$), equation (6) or equivalently equation (7) can be used to determine the proper orientation of the mode conversion surface and the intersecting angle $\alpha$ between the planes of optical aperture and mode conversion. In general, the primary acoustic wavevector $\vec{k}_a'$ is noncollinear with the optical wavevector $\vec{k}_o$. The choices of directions of the primary acoustic wave are not restricted, i.e., the angle $\theta_a$ is a design parameter.

Figure 5:
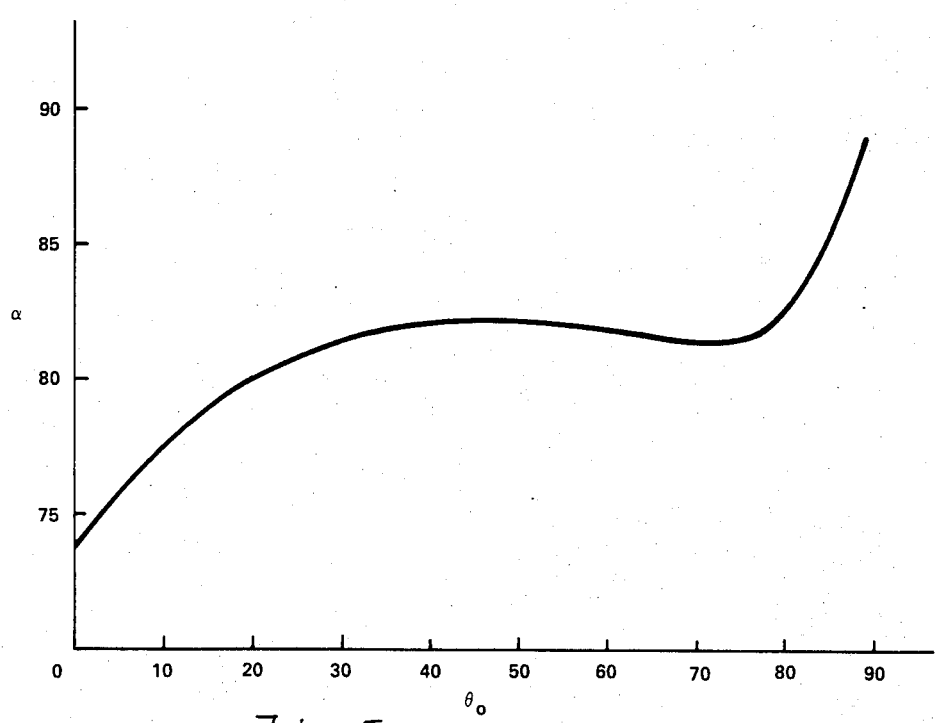
FIG. 5 is a representation, in graphic form, of the plot of the crystalline orientation of the internal mode conversion surface versus that of the optical aperture.

The preferred embodiment shown in FIG. 1 provides the significant advantage of simpler construction. The configuration allows bonding of acoustic transducers to the optical aperture face, which is one of the parallel faces of a right rectangular prism. In this case, Equation (3) is valid. The design of the TAOF is uniquely determined once the direction of the optical wavevector, i.e., the angle $\theta_o$, is chosen. For instance, consider the design of a TeO$_2$ TAOF utilizing the preferred embodiment shown in FIG. 1. The interaction plane is chosen to coincide with the (110) crystalline plane of the TeO$_2$ crystal. For the slow shear acoustic polarized along the (110) axis, the acoustic phase velocity is given by Equation (4) with the elastic constants $C_{44}=2.65\times10^{10}N/m^2$ $C_{66}^*=\frac{1}{2}(C_{11}-C_{12})=2.25\times10^9N/m^2$. By utilizing Equations (3), (7) and (8), the prism angle $\alpha$ is determined as a function of the incident light angle $\theta_o$. The result is plotted in FIG. 5. It is to be noted that for all choices of optical aperture orientation ($\theta_o$), the angle $\alpha$ is closed to 90°.

A preferred embodiment of particular practical importance is the transverse TAOF shown diagrammatically in FIG. 2. The interaction geometry of a transverse TAOF is such that the incident light beam is perpendicular to the group velocity, $\vec{V}_g$, of the interacting acoustic wave, i.e., $$\tan\theta_o \tan\theta_g = -1 \quad (9)$$

where $\theta_g$ is the polar angle of the acoustic group velocity $\vec{V}_g$.

Equations (8) and (9) and the slowness curve of the acoustic wave (e.g., Equation (4) for the slow shear mode in TeO$_2$) determine the operating point (i.e., the directions of optical and acoustic wavevectors). For instance, considering the design of transverse TAOF usng the (110) polarized slow acoustic mode in TeO$_2$, the correct choice for the optical and acoustic wavevector direction are determined: $\theta_a'=\theta_o=72.3°$, $\theta_a=104.9°$. From Equations (4) and (7), or the plot shown in FIG. 5, the prism angle $\alpha$ is found to be 81.3°.

I claim:

1. Apparatus for diffracting light from a first polarization to a second polarization, said apparatus comprising an acoustically anisotropic, optically birefringent crystal, means for passing a light beam through said crystal along a selected axis oriented at a non-zero angle with the optic axis of said crystal; means for exciting a first acoustic wave in said crystal and varying the frequencies of said first acoustic wave; means for directing said first acoustic wave to propagate along a selected direction in said crystal to be incident on an internal reflection surface of said crystal to excite a second acoustic wave such that the acoustic group velocity of the said second acoustic wave is noncollinear with the incident light beam in the said crystal and such that the tangents to the locus of the wave vectors for the incident light and diffracted light are substantially parallel; the orientation of said internal reflection surface being determined by the relation, $$\tan\alpha = \frac{V_a'\sin(\theta_a'-\theta_a)}{V_a - V_a'\cos(\theta_a'-\theta_a)}$$

wherein "$\alpha$" is the angle between the normals of said internal reflection surface and said first acoustic wave, $V_a'$ and $V_a$ are the phase velocities of said first and second acoustic wave, respectively, and $\theta_a'$ and $\theta_a$ are the polar angles of said first and second acoustic waves, respectively.

2. Apparatus as in claim 1 wherein the said means for exciting the said first acoustic wave in the said crystal comprises at least one acoustic transducer bonded to the said crystal on the same face thereof through which said incident light enters said crystal.

3. Apparatus as in claim 2 wherein said crystal comprises telluride oxide (TeO$_2$).

4. Apparatus as in claim 1 wherein the group velocity of the said second acoustic wave is substantially perpendicular to the said axis of said light beam.

* * * * *